(12) United States Patent
Gershom

(10) Patent No.: US 7,941,504 B2
(45) Date of Patent: May 10, 2011

(54) GLOBAL PERIPHERAL DEVICE SHARING SYSTEM AND METHOD

(76) Inventor: Efraim Gershom, Overland Park, KS (US)

( * ) Notice: Subject to any disclaimer, the term of this patent is extended or adjusted under 35 U.S.C. 154(b) by 0 days.

(21) Appl. No.: 12/719,300

(22) Filed: Mar. 8, 2010

(65) Prior Publication Data

US 2010/0161725 A1  Jun. 24, 2010

Related U.S. Application Data

(63) Continuation-in-part of application No. 11/701,727, filed on Feb. 2, 2007, now abandoned.

(60) Provisional application No. 60/771,060, filed on Feb. 7, 2006.

(51) Int. Cl.
*G06F 15/16* (2006.01)
*H04L 12/28* (2006.01)

(52) U.S. Cl. ........ 709/219; 709/201; 709/203; 370/401; 370/503

(58) Field of Classification Search ........... 709/217–219
See application file for complete search history.

(56) References Cited

U.S. PATENT DOCUMENTS

| 7,292,588 | B2 * | 11/2007 | Milley et al. | 370/401 |
| 2002/0186676 | A1 | 12/2002 | Milley et al. | |
| 2003/0078965 | A1 * | 4/2003 | Cocotis et al. | 709/203 |
| 2004/0130740 | A1 * | 7/2004 | Lawrence et al. | 358/1.13 |
| 2005/0043056 | A1 * | 2/2005 | Boesen | 455/550.1 |
| 2005/0117719 | A1 | 6/2005 | Hyotani et al. | |
| 2006/0069805 | A1 * | 3/2006 | LeBlanc et al. | 709/245 |
| 2010/0130233 | A1 * | 5/2010 | Parker | 455/456.3 |

* cited by examiner

*Primary Examiner* — Ian N Moore
*Assistant Examiner* — Thai N Nguyen
(74) *Attorney, Agent, or Firm* — Law Office of Mark Brown, LLC; Mark E. Brown

(57) ABSTRACT

A global peripheral device (GPD) sharing system enables users to remotely utilize various peripheral devices via a connection, such as the worldwide web (Internet). Client software is loaded on the computers associated with the users and the owners of the peripheral devices. A centralized GPD server is connected to a storage and queue appliance for maintaining a function queue, such as "print files". A GPD sharing method is also provided for providing users with temporary or permanent functional access to remote peripheral devices, which can be accessed through PCs or dedicated devices connected to the GPDs owned by the device owners. The GPD system operates cross-platform permitting users and owners of peripheral devices to communicate although they may not be using the same computing platform, or only one party has a license for software or a peripheral device.

1 Claim, 6 Drawing Sheets

GLOBAL PERIPHERAL DEVICE SHARING SYSTEM AND METHOD

CROSS-REFERENCE TO RELATED APPLICATIONS

This application is a continuation-in-part of U.S. Non-Provisional patent application Ser. No. 11/701,727, filed Feb. 2, 2007 now abandoned, which claims priority in U.S. Provisional Application Ser. No. 60/771,060, filed on Feb. 7, 2006, the contents of which are incorporated herein by reference in their entirety.

BACKGROUND OF THE INVENTION

1. Field of the Invention

The present invention relates generally to interconnectivity among computer systems and peripheral devices, and in particular to a system and method for globally sharing peripheral devices, such as printers.

2. Description of the Related Art

Computer systems have a wide variety of configurations, including stand-alone and networks. Peripheral devices are a common feature of many, if not most, computer systems. Peripheral devices are virtually unlimited in function and complexity, and can provide input and/or output functions for computers and computer networks. Input peripheral devices generally provide data, which can originate from the sources including users, other computers, etc. Output peripheral devices generally provide means for communicating the results of computing operations. For example, peripheral display devices include monitors.

The results of computing operations are commonly printed on various media. The term "printing" as used herein has a very broad scope and includes various media of virtually unlimited size, plotting, desktop publishing, and various other functions resulting in the application of output data to any appropriate tangible media. Although many types of printers are available at reasonable costs and computer users typically have one or more peripheral devices, there are many situations in which printers and other peripheral devices are not readily accessible to computer users. Peripheral device costs, specialized purposes, remote location and other factors have created a need for sharing peripheral device resources with computer users on a global basis.

Peripheral device sharing can occur within local area networks (LANs), wide area networks (WANs) and via the worldwide web (Internet), which generally comprises a network of networks. For purposes of sharing peripheral device resources, the worldwide web (Internet) enables users and remote locations to transmit data to and receive data from peripheral devices located virtually anywhere, in both hardwired and wireless functional modes.

Existing providers of access to peripheral devices, such as printers, tend to be somewhat limited in only offering printers on their premises for certain types of applications, e.g., desktop applications, and file types. For example, the PrinterOn Corporation (www.printeron.com) enables documents to be printed from desktop and wireless devices on printers located worldwide. Moreover, adaptability to mobile input devices, such as cell phones and personal data assistants (PDAs), has not previously been available with the advantages and features of the present invention. For security purposes, the GPD system enables peripheral device utilization without transferring files. For example, one-time usage, e.g. for printing using predetermined user profiles, functionalities can be programmed into the system whereby the users' files no longer exist on the device owners' systems after the peripheral device jobs are completed.

SUMMARY

In the practice of an aspect of the present invention, a system and method are provided for enabling users to remotely share peripheral devices. The users can access the global peripheral device (GPD) system via the worldwide web (Internet) from their own computers, or from various mobile devices, including cell phones and PDAs. A GPD server can provide various functions in connection with device utilization, including switching, user profile storage, file queuing while awaiting peripheral device access, etc. The GPD system operates cross-platform permitting users and owners of peripheral devices to communicate although they may not be using the same computing platform, or only one party has a license for software or a peripheral device.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Certain terminology will be used in the following description for convenience in reference only and will not be limiting. Said terminology will include the words specifically mentioned, derivatives thereof and words of similar meaning.

Figure 1:
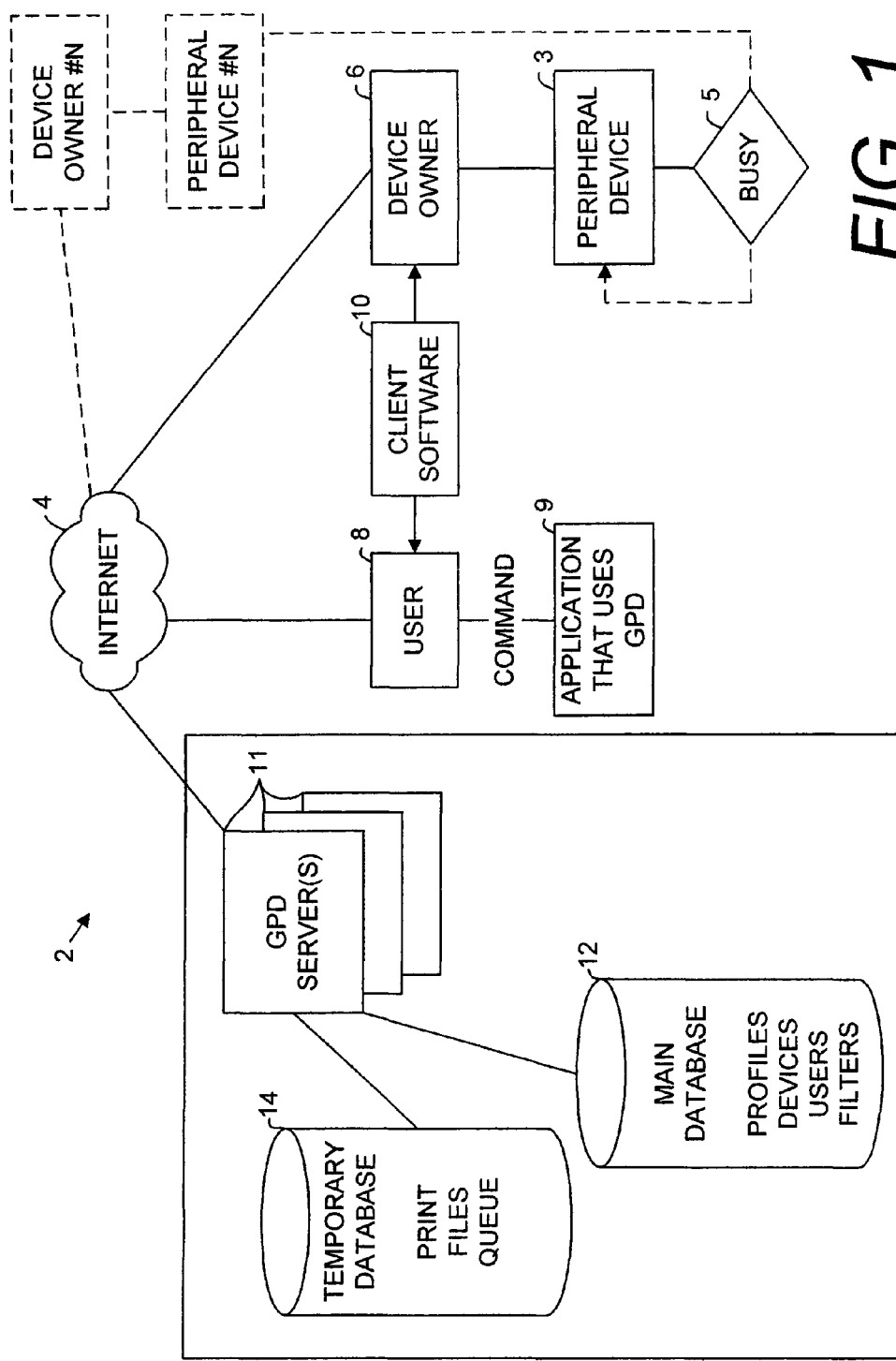
FIG. 1 shows a system embodying the present invention.

Referring to the drawings in more detail, in FIG. 1 the reference numeral 2 generally designates a system for globally or remotely sharing global peripheral devices (GPDs) 3. As used herein the terms "global" and "remote" and derivatives thereof are used broadly to describe peripheral devices whose locations are virtually unlimited. As used herein, the term "peripheral device" is to be broadly construed to include any type of device capable of control globally, e.g. from a remote location. For example, "smart homes" and "smart buildings" commonly include equipment, appliances and other devices, which can be controlled from remote locations and can include microprocessors. Thus, peripheral devices can be accessed from geographically remote locations, or from different systems (e.g. networks) regardless of their relative locations. Without limitation on the generality of useful applications of the invention, the system 2 is shown implemented globally via the worldwide web (Internet) 4. The parties can include device owners 6 and users 8. The users 8 can output commands to applications 9 that use GPDs. Client software 10 is loaded on the computers of the device owners (collectively designated 6) and the computers of the users (collectively designated 8). The client software 10 is peer-to-peer software, which allows the device owners 6 to share their GPDs 3 globally, administrate incoming device commands (e.g., without limitation printing, faxing, storing, displaying, etc.), add/remove additional GPDs 3 and assign a global device ID for each shared peripheral device 3. If a peripheral device 3 is busy, as indicated at 5, the command can loop back to the peripheral device 3, or be diverted to peripheral device #n, which is associated with device owner #n. Users 8 need only download the client software 10 and specify the global device ID that they want to use (e.g. a printer ID). The users 8 of GPDs do not need to upload the specific drivers for multiple devices in order to use them. To send a file to a GPD 3, the corresponding command (e.g., print, save, etc.) is entered normally as if the file were being sent to a local peripheral device attached to the user's LAN. The client software 10 then transfers a command along with the file and the peripheral device ID via the worldwide web 4 to the device owner's computer 6. Alternatively, a direct peer-to-peer transfer can occur. If the device owner's computer 6 is active, the command is executed, e.g. a print job is performed. If the device owner's computer 6 is off, the command can be stored in a main GPD server 11 for execution when the device owner 6 logs on.

By way of example and without limitation on the generality of useful peripheral devices, a printer application is described. The user 8 inputs a print command, and designates the peripheral device name or ID. From a user's point of view, the system 2 performs like a normal print function to a local printer. However, the client software 10 transfers the print command along with the peripheral device 3 ID to the device owner 6 for outputting to the identified GPD 3. The device command and data can be interpreted and executed according to profiles stored in a main database 12, which is connected to the GPD server 11. The GPD server 11 is also connected to a storage and queue appliance 14, which can be adapted for storing various command queues, such as printer queues. The software 10 resolves the global device ID with a specific device owner location/computer 6 associated with a peripheral device 3.

The peripheral device owners 6 can comprise operators, i.e. individuals and businesses, who own or utilize peripheral devices 3, who will generally also be equipped with personal computers (or "dummy" terminal-like devices, as described below), Internet access and GPD client software 10. The GPD client software can be used to establish a suitable connection in the event peer-to-peer connectivity cannot be accomplished due to firewalls, parties being off-line, etc. The system users 8 generally have personal computers, Internet access and the GPD client software 10. The GPD main server 11 can comprise, for example, a web server(s) connected to a main database 12, which is adapted for containing profiles, device IDs, filters, etc. The storage and queue appliance 14 can store files and commands that have been transferred to the GPD server 11, such as print files, and handle queue administration.

Figure 2:
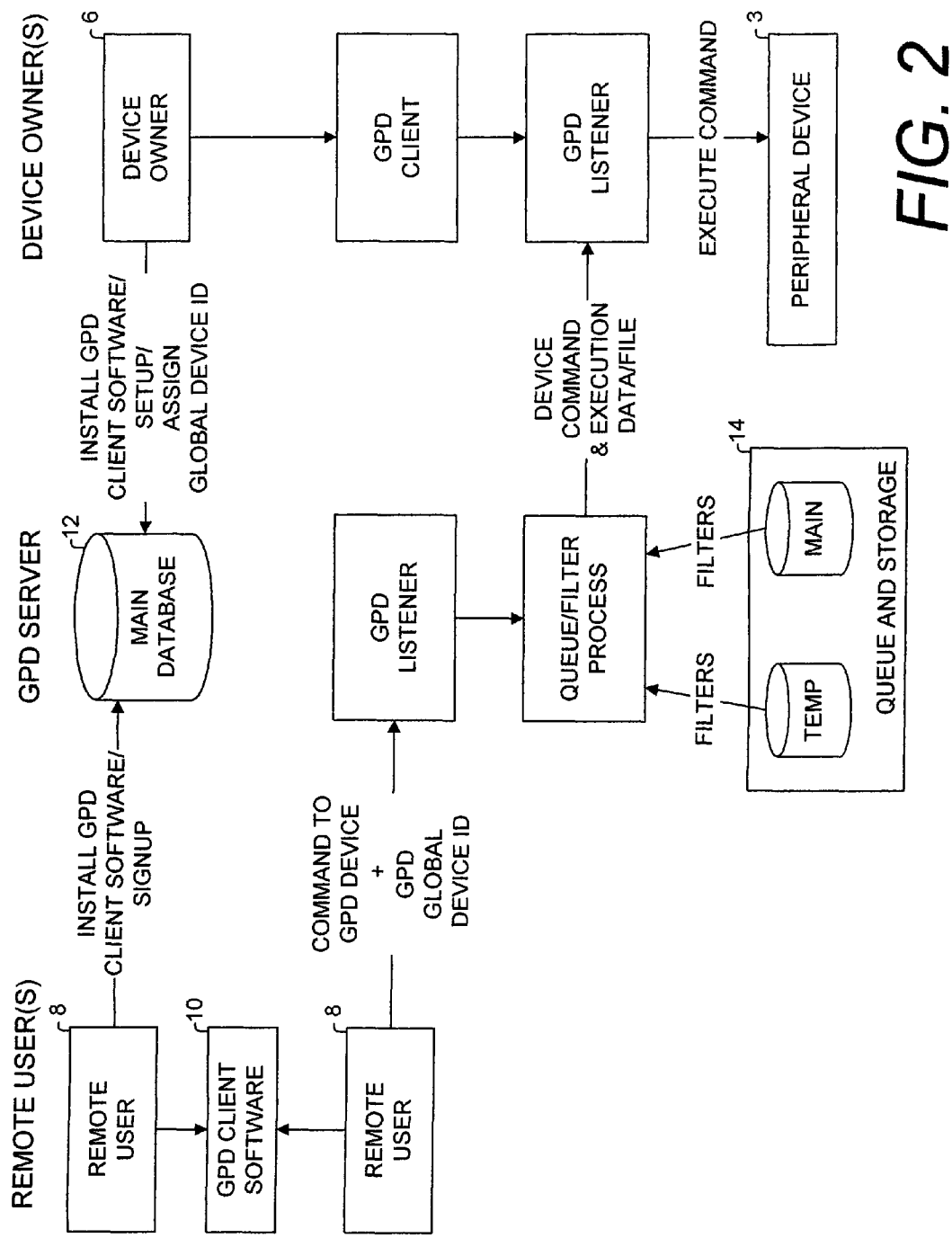
FIG. 2 shows the general process for practicing the GPD sharing method.

FIG. 2 is a flow diagram showing the general process for practicing the global peripheral device (GPD) sharing method of the present invention. The device owners 6 and the users 8 install the GPD client software on their respective computers, or other computer-like devices, such as PDAs, cellphones, etc. The device owners 6 register their GPDs 3. The GPD main server 11 assign the GPD IDs, which the device owners 6 share with the users 8. The users 8 execute commands via their Internet-linked computer is, including the GPD IDs for connecting to the loop or network of GPDs, whereupon the device users 8 can perform operations as needed. The GPD client and server software administrate the queue in the storage and queue appliance 14, perform filtering/authorization functions and transfer data to the client software 10 of the device owners 6. The device owners 6 can manage the GPDs 3 via the client software 10. Users 8 can update the buyers and sellers sign-up to the GPDs 3.

Figure 3:
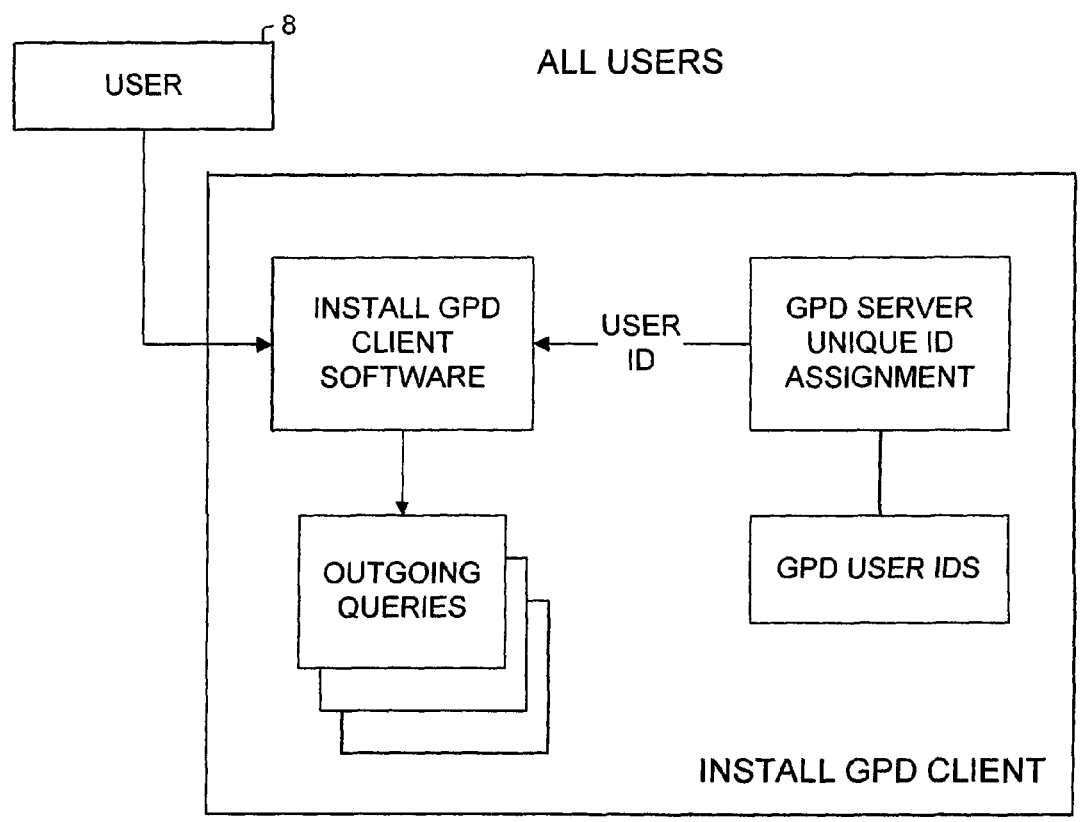
FIG. 3 shows a GPD client/user installation procedure.
Figure 4:
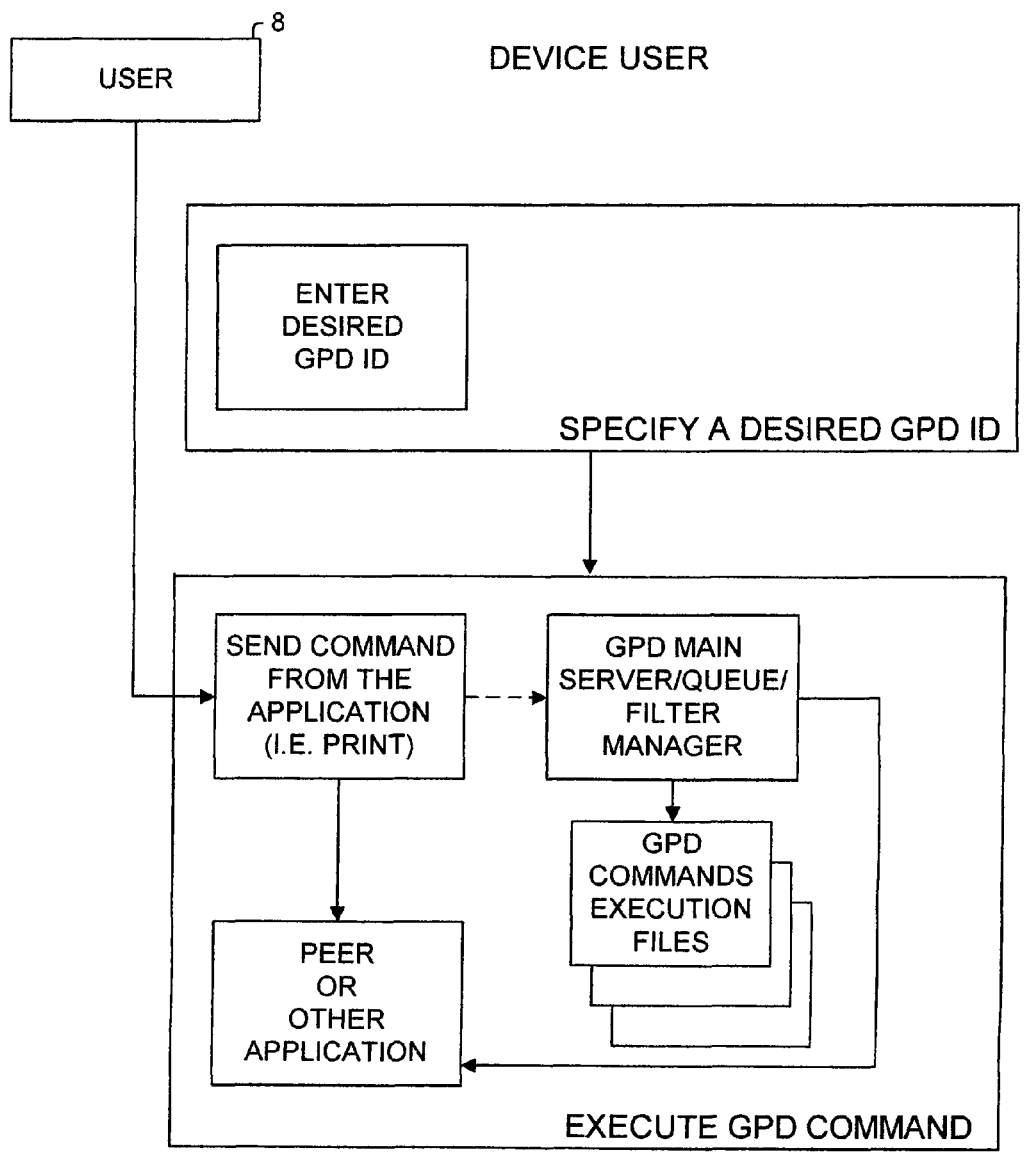
Figure 5:
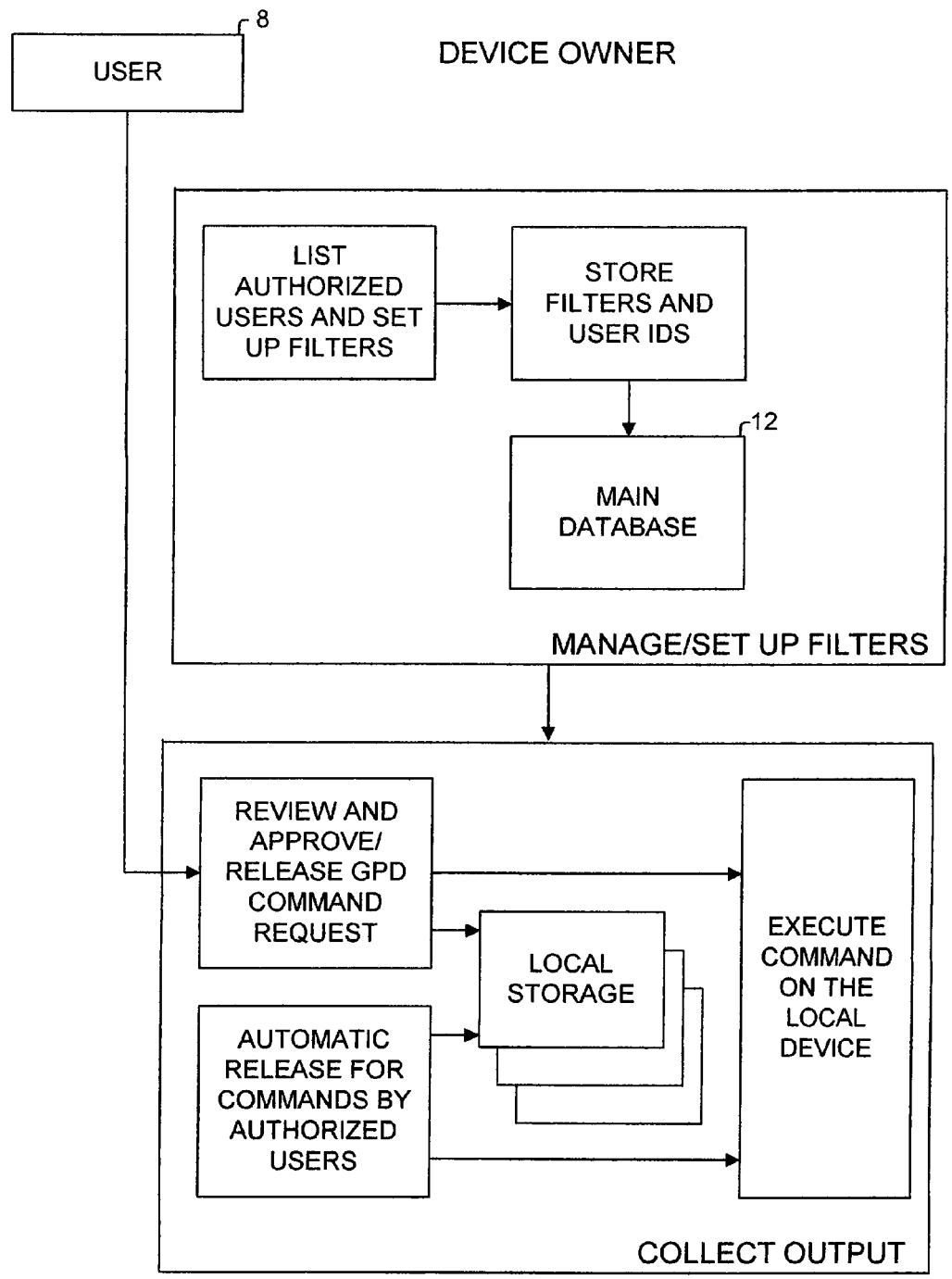
FIG. 5 shows a device owner collect output procedure.

Without limitation on the generality of useful applications of the GPD system 2, several additional exemplary applications are described as follows. Some of the procedures of such exemplary applications are shown in FIGS. 3-5. Other procedures will be well-known to those skilled in the art. Relatively expensive peripheral devices, such as specialized printers and other specialized appliances, can be included in the GPD loop for use by authorized users 8 where such devices and appliances are not accessible by LANs to which the users 8 have access. Sharing among users 8 (e.g., user groups) can be accommodated on temporary and permanent bases. The device owner 6 can also be a user 8 in this model, whereby the non-owning users 8 can avoid responsibilities for maintaining, upgrading and replacing the shared peripheral device 3, which responsibilities can be assumed by the users 8/device owners 6 according to predetermined arrangements, which can include compensation for such responsibilities. The non-owning users 8 are not required to install the drivers for the GPDs 3.

Users 8 can benefit from the GPD system 2 from remote locations, e.g. when traveling. The users 8, and other components of the system 2, can thus be either stationary or mobile. Thus, the Internet connections provided by many hotels, airports and temporary residences can be utilized for GPD access globally. For example, the lodging facilities can own the peripheral devices 3 and provide access as a service to their guests. A wide variety of institutions and facilities, such as airports, campuses, libraries and restaurants can provide wireless connections (e.g., via "WiFi" zone capabilities and similar wireless connections) whereby passing customers (i.e. users) can be accommodated and connected to the server 11 without having to load or install particular device drivers, connect to local area networks (LANs) or utilize complex file sharing programs. Various organizations, particular those with multiple LANs, can benefit from the GPD system 2 whereby devices can be made available to the organizations' employees without verifying and/or qualifying the users 8, which security functions can be performed by the main server 11.

The system 2 can be utilized from various computer platforms, including PDAs and PCs with different operating systems. The GPD system 2 is adapted for transferring execution data in formats compatible with the peripheral devices 3. The GPD system 2 is further adapted for commercializing ownership of GPDs 3 whereby access and user fees can be charged based on orders of (command and execution data) via the Internet without having to set up a proprietary system to connect to a particular GPD 3. The system 2 can provide a security function whereby the transfer files are not shared with or accessible by the GPD owner 6. The remote user can be protected by sending only the execution file that only the device can read, e.g. Postscript or EMF-formatted files for printing functions. The original files need not be shared. Thus, for example, the device owners 6 may only need one-time execute/print permissions.

Yet another application relates to a user 8 executing a command from an application, which may not be installed on the device owner's system. "File sharing" would not work in this model because the device owner will not be able to open a file/application and execute the contents to the device. The GPD system 2 addresses this issue by transferring the command and execution data as it was sent locally.

The GPD ID is unique to each GPD 3 and is provided when the device is registered, whereby the GPD system 2 stores the device profile and ID on the main server 11 as well as locally. The GPD device owners 6 can add, remove or modify devices 3 as needed. Authorization/filtering can be accomplished by the GPD owners 6 constructing the GPD applications to share their respective devices 3 with particular groups of GPD users 8. Only authorized users 8 will thus be able to execute commands to the GPDs 3 owned by particular device owners 6, who can add, remove or modify respective lists of authorized users, which information can be stored in the main server 11. Alternatively, device owners 6 can make available their respective devices 3 globally, i.e. to all users 8. The GPD system 2 can store the device owners 6 preferences and lists on the local GPD database, as well as in the main database 12. The GPD system can determine whether to send GPD commands to the device owner 6 or block them, based on the preferences input by the device owner 6. The GPD application can be preprogrammed to send the command and the execution file/data by matching the GPD ID with a particular device owner 6.

Both automatic and manual functions can be programmed into the GPD client application. For example, the GPD system 2 can automatically execute a command if preprogrammed accordingly. Alternatively, command and execution files can be held until released manually by the device owners 6. For example, queries can be matched with particular sellers' catalogs utilizing an auto-reply function for comparing incoming queries with sellers' catalog records and sending their replies to the buyers for matching catalog records. The GPD system 2 can include a server submitter process, which can reside on the main GPD server 11 for constantly reading the communications for all logged-in device owners 6 and then sending the commands along with the execution file/data to particular device owner GPD applications. A GPD listener function includes a process whereby device owners 6 constantly monitor communications for particular users 8, thus placing incoming commands in the local GPD application for further action, which can be manual or automated. A GPD client submitter function can optionally be provided whereby a user 8, who is not connected to the Internet, tries to execute a peer-to-peer command to a GPD, which command is stored along with the execution file/data until the user 8 connects to the Internet. Once the Internet connection with the user 8 is made, the GPD client submitter function sends out the pending command and its related execution file/data.

The GPD system 2 can utilize two different methods of providing drivers for the GPDs in the loop or network. For example, a common language can be utilized that all or most of the peripheral devices 3 can understand, e.g. Postscript format for printers. A second method is to have the GPD client software pull the driver out of a particular GPD ID from the main server or directly from the GPD device owner's computer 6 and install it on the user's computer 8. When a device owner 6 registers a new GPD 3, the system 2 can pull the specific driver to the main server 11 and have it available for users 8 who want to use the specific GPD ID. A third method is for the main server 11 to take care of drivers, etc.

Figure 6:
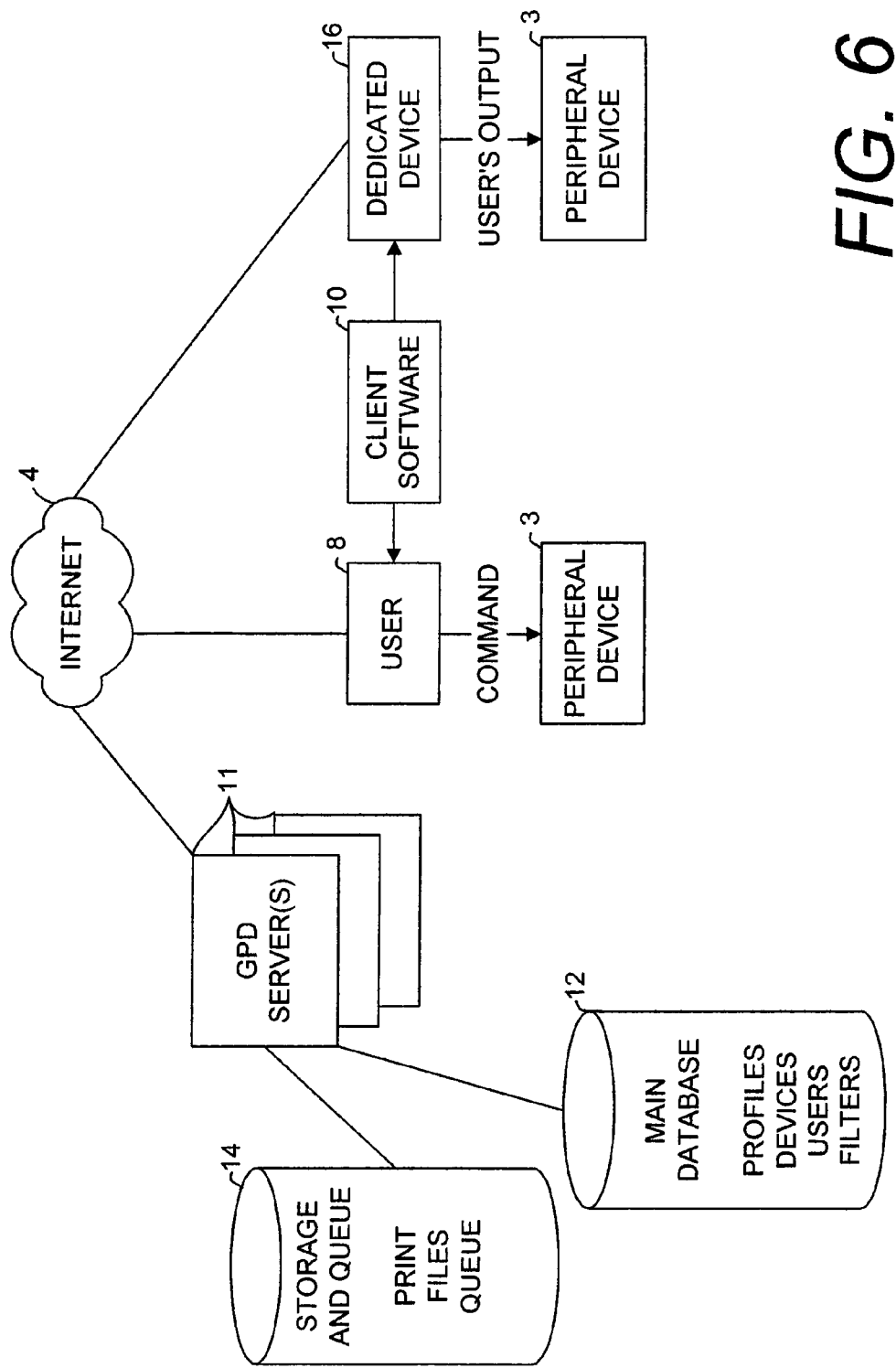
FIG. 6 shows a GPD system comprising an alternative embodiment of the present invention utilizing a dedicated device.

FIG. 6 shows an alternative embodiment of the present invention utilizing a dedicated device 16, which receives the client software 10 and is connected to a GPD 3. The GPD dedicated device 16 can be a "dummy" device, as opposed to a multi-functioning processor, i.e. a PC. The GPD dedicated device 16 need only perform three functions: 1) connection to the Internet; 2) running the GPD client software and listening to incoming GPD commands; and 3) sending the GPD commands and execution files to the GPD 3. The dedicated device 16 can thus avoid the need for an individual and/or a more expensive and complex PC for connection to the GPD 3. It can run at all times independently or connected to an individual computer. The GPD dedicated device 16 can have an administrative interface whereby an administrator can update the GPD data. Important advantages of the GPD dedicated device 16 include enabling entities to offer services (e.g. printing) to their customers and/or employees without maintaining a personal computer dedicated to such functions.

The GPD system 2 and the methodology are particularly suitable for mobile user applications. For example, cell phones, personal data assistants (PDAs) and other portable devices can access the system 2 through hard-wired or wireless connections from virtually unlimited locations and utilize the resources comprising all available and compatible GPD peripheral devices. Significant communications, commerce and other advances and benefits can be achieved through such connectivity.

Another type of application relates to communications, whereby documents that have previously been delivered by mail or courier can simply be printed on the recipients' printers. For example, billing invoices and statements of account can be distributed in this manner. This application could result in substantial savings and postage and related expenses, particularly for businesses that regularly bill large numbers of customers. For example, many professional services offices, such as health-care providers, accountants and lawyers incur substantial expenses in connection with billing, and could realize substantial savings utilizing the system and method of the present invention.

II. Alternative Embodiment GPD System 2

An alternative embodiment GPD system 2 includes the ability of a user 8 to communicate with a device owner 6 regardless of whether either party is on the same computing platform or on a different computing platform, or whether only one party has a software license pertaining to a particular system software or application software. As discussed above, the system 2 may be utilized where the user 8 and device owner 6, or user 8 and dedicated device 16 run on different operating systems. In particular, a user 8 may be using a mobile device including, but not limited to a cell phone, PDA, smart phone, touch screen device, tablet PC, or notebook computer. The mobile device operating systems may include, but are not limited to, one or more of the following: DOS; Microsoft Windows; Mac; Apple iPhone; Linux; Unix; Google Chrome; Google Android; Symbian; RIM Blackberry; Palm; or an operating system written for a specific application or hardware. By way of example, and without limitation on the combinations of software used by the system 2 or useful applications of the system 2, a user 8 may be using a mobile device running an Apple iPhone operating system software and a specialized application software, and a device owner 6 or dedicated device 16 may be running a Microsoft Windows operating system and not have the specialized application software. The user 8 may desire to use the particular GPD 3 connected to a particular device owner 6 or dedicated device 16 using the internet 4. Using their mobile device, the user 8 may identify a particular action or command to communicate to the GPD 3 and output a file containing data, a command, and the particular GPD 3 ID. Upon receipt of the user 8 communication, the GPD 3 executes the command regardless of the difference between the operating systems and software licenses.

It is to be understood that the invention can be embodied in various forms, and is not to be limited to the examples discussed above. Other components and configurations can be utilized in the practice of the present invention.

Having thus described the disclosed subject matter, what is claimed as new and desired to be secured by Letters Patent is:

1. A global peripheral device (GPD) system for globally sharing peripheral devices via the Internet, which system comprises:
   a GPD server connected to the Internet;
   a GPD user having a mobile computing device connected to said GPD server, said mobile computing device having a first operating system;
   a GPD temporary database including data and command files associated with said GPD user and accessible by said GPD server;
   a GPD main database connected to said GPD server, said GPD main database including GPD user files associated with said GPD user and accessible by said GPD server, said GPD user files including profiles of GPD users, global peripheral device IDs, and filters;
   a GPD owner connected to the Internet;
   said GPD owner having a second operating system;
   a peripheral device connected to said GPD owner, said peripheral device having a global peripheral device ID, said global peripheral device ID stored at said GPD server and said GPD owner;
   a peer-to-peer client software for connecting said GPD user to said remote peripheral device; said client software including GPD user software and GPD owner software;
   said GPD user software including a signup function and adapted for sending said GPD user data, command, and said global peripheral device ID to said GPD owner;
   said GPD owner software including a setup/assign global peripheral device ID function and an add/remove GPD user function;
   a GPD user submitter function adapted for receiving said GPD user data, command, and global peripheral device IDs communicated to said GPD owner;
   a GPD owner listener function adapted for receiving said GPD user data and command files from said GPD temporary database;
   a peer-to-peer peripheral device diversion function whereby a GPD user command directed to a remote peripheral device is diverted from an off remote peripheral device not connected to said GPD sever to said GPD server for execution when said off remote peripheral device becomes connected to said GPD server;
   a busy peripheral device diversion function whereby a GPD user command is diverted from a busy peripheral device to an available peripheral device;
   a peripheral device receiving said GPD user's data, command, and global peripheral device ID;
   said GPD system being adapted for sending a file from an owner to said peripheral device, wherein said file has previously been delivered to said owner via additional means;
   and said GPD system being adapted for sending a file from a user to said peripheral device using a software license belonging to said GPD owner;
   wherein said peripheral device comprising a document printer; and said additional means of delivery being physical delivery.

* * * * *